US008832515B2

(12) United States Patent
Asterjadhi et al.

(10) Patent No.: US 8,832,515 B2
(45) Date of Patent: Sep. 9, 2014

(54) BLOCK ACKNOWLEDGEMENT MECHANISM INCLUDING SEQUENCE NUMBER ACKNOWLEDGEMENT AND RETRY BIT

(75) Inventors: Alfred Asterjadhi, San Diego, CA (US); Simone Merlin, San Diego, CA (US); Maarten Menzo Wentink, Naarden (NL); Santosh P. Abraham, San Diego, CA (US); Zhi Quan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 6 days.

(21) Appl. No.: 13/545,933

(22) Filed: Jul. 10, 2012

(65) Prior Publication Data
US 2013/0227371 A1 Aug. 29, 2013

Related U.S. Application Data

(66) Substitute for application No. 61/605,078, filed on Feb. 29, 2012.

(51) Int. Cl.
*H04L 1/16* (2006.01)
*H04L 1/08* (2006.01)
(52) U.S. Cl.
CPC ............... *H04L 1/08* (2013.01); *H04L 1/1614* (2013.01); *H04L 1/1635* (2013.01)
USPC .......................................... 714/748; 714/750
(58) Field of Classification Search
CPC ........................... H04L 1/1809; H04L 1/1812
USPC ................... 714/748, 749, 750, 758, 774, 52
See application file for complete search history.

(56) References Cited

U.S. PATENT DOCUMENTS 7,675,911 B2    3/2010  Singh et al.
7,680,148 B2 *  3/2010  Nishibayashi et al. ....... 370/465
(Continued)

FOREIGN PATENT DOCUMENTS

EP         0286383 A2    10/1988
WO       2004109440 A2   12/2004
(Continued)

OTHER PUBLICATIONS

Gong F et al., "A new error control scheme for high speed networks", Tactical Communications Conference, vol. 1 .Digital Technology for the Tactical Communicator., Proceedings of the 1994 Fort Wayne, IN, USA May 10-12, 1994, New York, NY, USA .IEEE, US, May 10, 1994, pp. 437-448, XP010149096, DOI: 10.1109/TCC.1994.472100 ISBN: 978-0-7803-2004-8.
(Continued)

*Primary Examiner* — Fritz Alphonse
(74) *Attorney, Agent, or Firm* — S. Hossain Beladi

(57) ABSTRACT

A method includes sending a sequence number acknowledgement (SN-ACK) from a first device to a second device. The SN-ACK identifies a last consecutively correctly received data unit and includes a retry bit indicating whether at least one data unit of the plurality of data units was received by the first device subsequent to the last consecutively correctly received data unit. The method also includes, when the retry bit has a first value, sending a block acknowledgement (BA) after sending the SN-ACK. The BA includes a bitmap, where each particular bit of the bitmap indicates whether a corresponding data unit was correctly received. When the retry bit has a second value and one or more of the plurality of data units were incorrectly received by the first device, the first device receives a retransmission of one or more data units without sending the BA to the second device.

29 Claims, 7 Drawing Sheets

(56) References Cited

U.S. PATENT DOCUMENTS

| | | |
|---|---|---|
| 7,760,700 B2 | 7/2010 | Frederiks et al. |
| 7,869,418 B2 * | 1/2011 | Nishibayashi et al. ....... 370/349 |
| 7,882,412 B2 | 2/2011 | Nanda |
| 7,903,632 B2 * | 3/2011 | Nishibayashi et al. ....... 370/349 |
| 2006/0018332 A1 | 1/2006 | Kakani et al. |
| 2006/0034274 A1 | 2/2006 | Kakani et al. |
| 2006/0034277 A1 | 2/2006 | Jang et al. |
| 2006/0034317 A1 | 2/2006 | Hong et al. |
| 2006/0048034 A1 | 3/2006 | Cho |
| 2006/0092871 A1 | 5/2006 | Nishibayashi et al. |
| 2006/0136614 A1 * | 6/2006 | Kakani et al. ................... 710/30 |
| 2007/0002810 A1 | 1/2007 | Trainin et al. |
| 2007/0258466 A1 | 11/2007 | Kakani |
| 2010/0050041 A1 | 2/2010 | Chang et al. |
| 2010/0146359 A1 | 6/2010 | Duan et al. |
| 2010/0182949 A1 | 7/2010 | Ji |
| 2011/0107168 A1 | 5/2011 | Jung et al. |
| 2011/0246840 A1 | 10/2011 | Khoshnevis et al. |
| 2012/0084616 A1 | 4/2012 | Wentink |
| 2013/0223210 A1 | 8/2013 | Asterjadhi et al. |
| 2013/0223211 A1 | 8/2013 | Asterjadhi et al. |
| 2013/0223212 A1 | 8/2013 | Asterjadhi et al. |
| 2013/0223213 A1 | 8/2013 | Asterjadhi et al. |
| 2013/0223338 A1 | 8/2013 | Asterjadhi et al. |
| 2013/0223345 A1 | 8/2013 | Asterjadhi et al. |

FOREIGN PATENT DOCUMENTS

| | | |
|---|---|---|
| WO | 2006022484 A1 | 3/2006 |
| WO | 2007033313 A2 | 3/2007 |
| WO | 2009157901 A1 | 12/2009 |

OTHER PUBLICATIONS

International Search Report and Written Opinion—PCT/US2013/022215—ISA/EPO—Apr. 3, 2013.

* cited by examiner

```
                                                      ┌─ 500
                                                      ▼

┌──────────────────────────────────────────── 502
                    │ Receive, at a first device, a BAR from a second device, where the BAR includes a
                    │ SSN of an earliest data unit of a plurality of data units sent by the second device to
                    │                              the first device
                    └──────────────────────────────────────────────────┘
                                                    │
                                                    ▼
                    ┌──────────────────────────────────────────── 504
                    │ In response to the BAR, send a SN-ACK to the second device, where the SN-ACK
                    │ identifies a last consecutively correctly received data unit of the plurality of data units
                    │ and where the SN-ACK includes a retry bit indicating whether at least one data unit
                    │  was received by the first device subsequent to the last consecutively correctly
                    │                           received data unit
                    └──────────────────────────────────────────────────┘
                                                    │
                                                    ▼
                                               ╱─ 506 ╲
                                              ╱  Retry Bit ╲────── No ──────┐
                                              ╲  Asserted? ╱                │
                                               ╲         ╱                  │
                                                    │                       │
                                                   Yes                      │
                                                    ▼                       │
                    ┌──────────────────────────────────────────── 508       │
                    │ Send a C-BA to the second device, where the C-BA includes a bitmap and where │
                    │    each particular bit of the bitmap indicates whether a corresponding data unit was │
                    │                            correctly received                                 │
                    └──────────────────────────────────────────────────┘   │
                                                    │                       │
                                                    ▼                       │
                    ┌──────────────────────────────────────────── 510       │
                    │    Receive a retransmission of one or more of the plurality of data units  │◄──┘
                    └──────────────────────────────────────────────────┘
```

*FIG. 5*

BLOCK ACKNOWLEDGEMENT MECHANISM INCLUDING SEQUENCE NUMBER ACKNOWLEDGEMENT AND RETRY BIT

CROSS-REFERENCE TO RELATED APPLICATIONS

The present application claims priority from commonly owned U.S. Provisional Patent Application No. 61/605,078 filed Feb. 29, 2012 and entitled APPARATUS AND METHODS FOR BLOCK ACKNOWLEDGEMENT COMPRESSION, the contents of which are expressly incorporated herein by reference in their entirety.

FIELD OF THE DISCLOSURE

The present disclosure relates to acknowledgement messages in wireless communication protocols.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

Devices such as wireless telephones often communicate using a wireless network. Communication via a wireless network typically involves a first device called an "originator" transmitting a message to a second device called a "recipient." The recipient then transmits an acknowledgement (ACK) to the originator indicating that the message was successfully received. If a recipient sends an ACK for every successfully received packet, the ACKs may congest the wireless network, especially when the recipient receives a large number of packets within a short period of time. To reduce overhead and medium occupancy due to ACKs, some wireless networks support a block ACK (BA). Instead of sending ACKs for every received packet of a packet stream, a recipient can instead send a single BA indicating that multiple packets of the packet stream were received successfully.

However, sending a BA even if all packets were received successfully may be inefficient. Moreover, current BA mechanisms involve the recipient sending a constant size (e.g., 8-byte) bitmap to the originator, where the bitmap indicates whether each packet in the packet stream was received successfully. In situations where only a few packets were erroneous, the use of a constant size bitmap may add overhead.

SUMMARY

Systems and methods of communicating a block acknowledgement (BA) are disclosed. In particular, the disclosed systems and methods may reduce the frequency and size of block acknowledgement messages. Thus, the disclosed systems and methods may be especially applicable in low-data rate networks (e.g., sub-1 GHz networks operating in accordance with the Institute of Electrical and Electronics Engineers (IEEE) 802.11ah standard).

Once a BA session is initiated, the originator may send one or more packets, such as medium access control (MAC) Protocol Data Units (MPDUs), to the recipient where each MPDU has a sequence number (SN). The originator may send a BA request (BAR) for the previously sent MPDUs. In accordance with the disclosed techniques, the recipient may respond to the BAR with a sequence number ACK (SN-ACK), where the SN-ACK includes a SN field identifying the last consecutively correctly received MPDU. The SN-ACK may also include a retry bit indicating whether any of the MPDUs following the SN field was correctly received. For example, if MPDUs 1-10 are sent and the recipient successfully receives MPDUs 1-5 and MPDUs 8-9, the SN-ACK may have a value of 5 for the SN field (because MPDU 5 is the last consecutively correctly received MPDU) and the retry bit may be asserted (because an MPDU following SN, i.e. MPDU 8, was correctly received).

The originator may determine whether to retry transmission of any MPDUs based at least in part on the SN-ACK. For example, when the retry bit is asserted (e.g., has a first value), the originator may request a BA from the recipient, where the BA includes a bitmap indicating whether each MPDU was correctly received, so that the originator can determine which MPDUs should be retransmitted to the recipient. Alternately, when the retry bit is de-asserted (e.g., has a second value), the originator may retransmit any erroneous MPDUs without requesting the BA. If no MPDUs were erroneous, the originator may proceed to transmit MPDUs from a successive (e.g., next) block of MPDUs. In general, the originator may proceed to transmit MPDUs from the successive block of MPDUs if the originator has attempted to retransmit erroneous MPDUs from the current block a pre-determined number of times or if a time-out value has been exceeded.

In a particular embodiment, a method includes sending a SN-ACK from a first device (e.g., a recipient) to a second device (e.g., an originator) via a wireless network. The SN-ACK is associated with a plurality of data units (e.g., MPDUs) sent by the second device to the first device, where the SN-ACK identifies a last consecutively correctly received data unit, and where the SN-ACK includes a retry bit indicating whether at least one data unit of the plurality of data units was received by the first device subsequent to the last consecutively correctly received data unit. The method also includes, when the retry bit has a first value, sending a BA to the second device after sending the SN-ACK, where the BA includes a bitmap and where each particular bit of the bitmap indicates whether a corresponding data unit was correctly received by the first device. The method includes, when the retry bit has a second value and one or more of the plurality of data units were incorrectly received by the first device, receiving a retransmission of the one or more data units without sending the BA to the second device. When the retry bit has the second value and no data units of the plurality of data units were incorrectly received by the first device, the method may include receiving at least one data unit of a next block of data units.

In another particular embodiment, an apparatus includes a processor and a memory storing instructions executable by the processor to generate a SN-ACK to be sent from a first device to a second device via a wireless network. The SN-ACK is associated with a plurality of data units received by the first device. The SN-ACK identifies a last consecutively correctly received data unit of the plurality of data units and the SN-ACK includes a retry bit indicating whether at least one data unit of the plurality of data units was received by the first device subsequent to the last consecutively correctly received data unit. The instructions are also executable by the processor to, when the retry bit has a first value, generate a BA to be sent to the second device after sending the SN-ACK, where the BA includes a bitmap and where each particular bit of the bitmap indicates whether a corresponding data unit of the plurality of data units was correctly received by the first device. The instructions are further executable by the processor to, when the retry bit has a second value and one or more of the plurality of data units were incorrectly received by the first device, detect retransmission of the one or more data units without generating the BA to be sent to the second device.

In another particular embodiment, a method includes sending, from a second device (e.g., an originator), a plurality of data units to a first device (e.g., a recipient) via a wireless network. The method also includes receiving a SN-ACK from the first device. The SN-ACK identifies a last consecutively correctly received data unit of the plurality of data units, and the SN-ACK includes a retry bit indicating whether at least one data unit of the plurality of data units was received by the first device subsequent to the last consecutively correctly received data unit. The method further includes, when the retry bit has a first value, retransmitting one or more data units of the plurality of data units identified as erroneous by a block ACK (BA) received from the first device. The method includes, when the retry bit has a second value, retransmitting one or more data units without receiving the BA from the first device.

In another particular embodiment, an apparatus includes a processor and a memory storing instructions executable by the processor to generate, at a second device, a plurality of data units to be sent to a first device via a wireless network. The instructions are also executable by the processor to detect receipt of a SN-ACK from the first device. The SN-ACK identifies a last consecutively correctly received data unit of the plurality of data units and includes a retry bit indicating whether at least one data unit of the plurality of data units was received by the first device subsequent to the last consecutively correctly received data unit. The instructions are further executable by the processor to, when the retry bit has a first value, initiate retransmission of one or more data units of the plurality of data units identified as erroneous by a BA received from the first device. The instructions are executable by the processor to, when the retry bit has a second value, initiate retransmission of one or more data units without receipt of the BA from the first device.

One particular advantage provided by at least one of the disclosed embodiments is an ability to perform block acknowledgement while transmitting a reduced amount of data. When the retry bit is de-asserted, block acknowledgement may be performed without transmission of a bitmap, which may further reduce the amount of data transfer involved with block acknowledgement. By reducing the amount of data transfer involved, the disclosed embodiments may enable block acknowledgement in low-data rate (e.g., sub-1 GHz) wireless networks.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 5 is a flow chart to illustrate a particular embodiment of a method of operation at a recipient;

DETAILED DESCRIPTION

Figure 1:
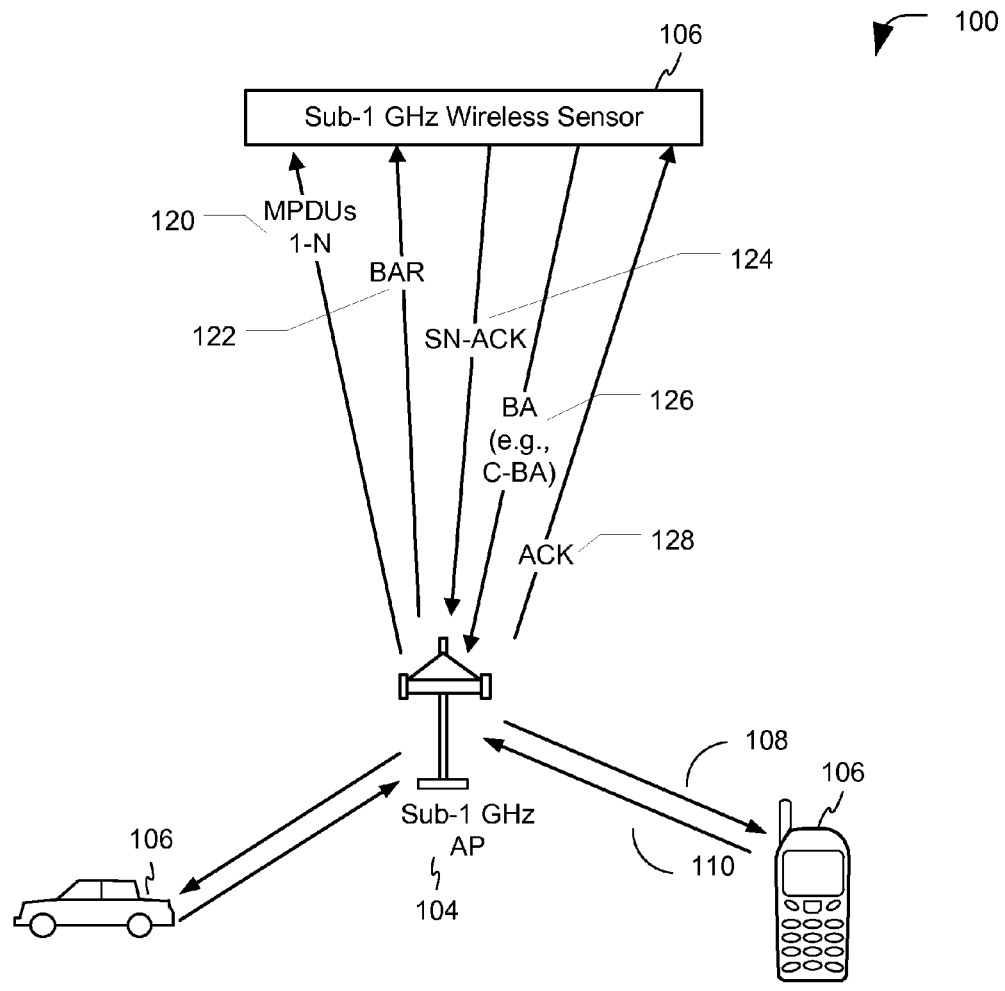
FIG. 1 is a diagram of a wireless communication system in which aspects of the present disclosure may be employed.

FIG. 1 illustrates an example of a wireless communication system 100 in which aspects of the present disclosure may be employed. The wireless communication system 100 may operate pursuant to a wireless standard, such as the IEEE 802.11ah standard.

Implementations of an IEEE 802.11ah protocol (e.g., as defined in the IEEE 802.11ah standard) may be used for sensors, metering, and smart grid networks. Aspects of certain devices implementing the 802.11ah protocol may consume less power than devices implementing other wireless protocols, and/or may be used to transmit wireless signals across a relatively long range, for example about one kilometer or longer. For example, IEEE 802.11ah-compatible devices may be used for smart metering or in a smart grid network. Such devices may provide sensor applications or be used in home automation. The devices may instead or in addition be used in a healthcare context, such as for personal healthcare. Sub-1 GHz devices may also be used for surveillance, extended-range Internet connectivity (e.g., for use with hotspots), or machine-to-machine communications.

The wireless communication system 100 may include an access point (AP) 104 that is configured to communicate with one or more mobile stations (STAs) 106. A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. Further, in some aspects, STAs 106 may communicate directly with each other and form a direct link (direct) between each other.

The AP 104 may act as a base station and provide wireless communication coverage in a basic service area (BSA). The AP 104 and associated STAs 106 may be referred to as a basic service set (BSS). In some embodiments, the wireless communication system 100 may not have a central AP 104 but rather may function as a peer-to-peer network between the STAs 106. In another example, the functions of the AP 104 described herein may alternatively be performed by one or more of the STAs 106.

During operation, the AP 104 and the STAs 106 may communicate data with each other. In a particular embodiment, data may be communicated in packets, such as medium access control (MAC) Protocol Data Units (MPDUs). For example, as shown at 120, the AP 104 may be an originator that sends N (N>=1) MPDUs to the STA 106 during a communication session. Each MPDU may have a sequence number (SN) (e.g., from 1 to N). After sending the Nth MPDU, the STA 106 may send a block acknowledgement (BA) request (BAR) 122 to the STA 106. The BAR 122 may include a starting SN (SSN) field, where the value of the SSN field identifies the first MPDU for which the BAR 122 is sent. To illustrate, when block acknowledgement for MPDUs 1–N is desired, the SSN field of the BAR 122 is equal to 1.

In response to the BAR 122, the STA 106 may send a sequence number ACK (SN-ACK) 124 to the AP 104. Formatting of the SN-ACK 124 is further described with reference to FIG. 2. The SN-ACK 124 may include a sequence number (SN) field, where the SN field identifies the last consecutively correctly received MPDU. In a particular embodiment, instead of including the entire SN, the SN-ACK 124 may include the last few (e.g., six) least significant bits of the SN to specify an offset from the SSN in the BAR 122. The SN-ACK 124 may also include a retry bit indicating whether at least one MPDU was received following the last consecutively correctly received MPDU. Table 130 of FIG. 1 illustrates two examples.

In Example 1, shown in row 132, MPDUs 1-10 are sent by the AP 104. The STA 106 successfully receives MPDUs 1-5 but does not receive MPDUs 6-10. The AP 104 then sends the BAR 122 having SSN=1. In this example, the STA 106 sends the SN-ACK 124 with SN=5 (because MPDU 5 is the last consecutively correctly received MPDU) and retry bit=0 (because no MPDU following MPDU 5 was correctly received).

In Example 2, shown in row 134, MPDUs 1-10 are sent by the AP 104. The STA 106 successfully receives MPDUs 1-5 and 8-9 but does not receive MPDUs 6-7 and 10. The originator then sends the BAR 122 having SSN=1. In this example, the STA 106 sends the SN-ACK 124 with SN=5 (because MPDU 5 is the last consecutively correctly received MPDU) and retry bit=1 (because other MPDU(s), i.e. MPDUs 8-9, were correctly received after MPDU 5).

It will be appreciated that in Example 1, the SN-ACK 124 may be sufficient to notify the AP 104 regarding every incorrectly received MPDU. That is, because the retry bit of the SN-ACK is equal to 0 and because the SN is equal to 5, the AP 104 can determine that none of the MPDUs following MPDU 5 were correctly received by the STA 106. Thus, the AP 104 may proceed to retry MPDUs 6-10 without receiving further data from the STA 106.

However, in Example 2, although the AP 104 can determine that at least one of MPDUs 6-10 was incorrectly received by the STA 106, the AP 104 may not be able to identify the specific MPDU(s) that were erroneous. Thus, in Example 2, the AP 104 may wait for a block ACK (BA) 126 from the STA 106 before retransmitting any MPDUs. The BA 126 may identify which MPDUs were incorrectly received by the STA 106. Thus, in Example 2, the BA 126 may indicate that MPDUs 6-7 and 10 were incorrectly received. In a particular embodiment, the AP 104 may send an ACK 128 in response to receiving the BA 126 before attempting to retransmit the erroneous MPDUs.

Various formats may be utilized for the BA 126. In one embodiment, the BA 126 may be an "uncompressed" BA that includes a bitmap, where a size of the bitmap is fixed regardless of which and how many MPDUs were unsuccessfully received. For example, the uncompressed BA may include a SSN field (e.g., having the same value as the SSN field of the BAR 122) and an 8-byte bitmap. Alternately, if packet fragmentation is used, the bitmap may be 128 bytes and each fragment of each packet may be acknowledged individually. However, use of an uncompressed BA may introduce unacceptable overhead.

In a particular embodiment, the BA 126 may be a "compressed" BA (C-BA). To reduce overhead, certain fields of a frame in which the C-BA is sent may be removed or modified. Moreover, the bitmap in the C-BA may be compressed or modified. For example, instead of including a fixed size (e.g., 8-byte) bitmap that includes a corresponding bit for each MPDU, the C-BA may include a variable sized bitmap that only includes information about MPDUs spanning a range from the first incorrectly received MPDU to the last incorrectly received MPDU.

To illustrate, if "1" designates an erroneous MPDU and "0" designates a successfully received MPDU, in Example 2, the bitmap of the C-BA may be "11001" for MPDUs 6-10. The C-BA may also include a limited length (e.g., 6-bit) SSN field having a value of 6 to indicate that the bitmap begins at MPDU 6 (e.g., MPDU 6 is the earliest erroneous MPDU) and/or a limited length SN field having a value of 10 to indicate that the bitmap ends at MPDU 10. Alternately, because the AP 104 can assume that the earliest erroneous MPDU is the MPDU following the SN of the SN-ACK 124, the SSN may identify the second-earliest erroneous MPDU. To illustrate, in Example 2, the C-BA may include a SSN equal to 7 and a bitmap "1001" for MPDUs 7-10. Upon receiving the C-BA, the AP 104 may retry the erroneously received MPDU(s) identified by the SSN and/or the bitmap of the C-BA. In another embodiment, the C-BA may include the SSN field and a length field indicating the length (e.g., in bytes) of the bitmap.

In a particular embodiment, different compression methods, such as run-length encoding (RLE) may be used instead of or in addition to the bitmap compression method described.

The wireless communication system 100 of FIG. 1 may thus enable performing block acknowledgement while transmitting a reduced amount of data. For example, in situations such as Example 1 above, the wireless communication system 100 of FIG. 1 may enable retransmission of failed packets without communication of a block acknowledgment (BA) and associated bitmap. Moreover, when a block acknowledgement bitmap is transmitted, the bitmap may have variable size and may thus occupy less space than the fixed size bitmap used in existing block acknowledgement schemes.

It should be noted that although FIG. 1 is described with reference to sub-1 GHz wireless networks (e.g., IEEE 802.11ah wireless networks), the disclosed block acknowledgement techniques may also be used with other types of networks. It should also be noted that although in the embodiment of FIG. 1 the AP 104 acts as an originator and the STA 106 acts as a recipient, this is for example only. Block acknowledgement may also be performed when an STA is the originator and an AP (or another STA) is the recipient.

Figure 2:
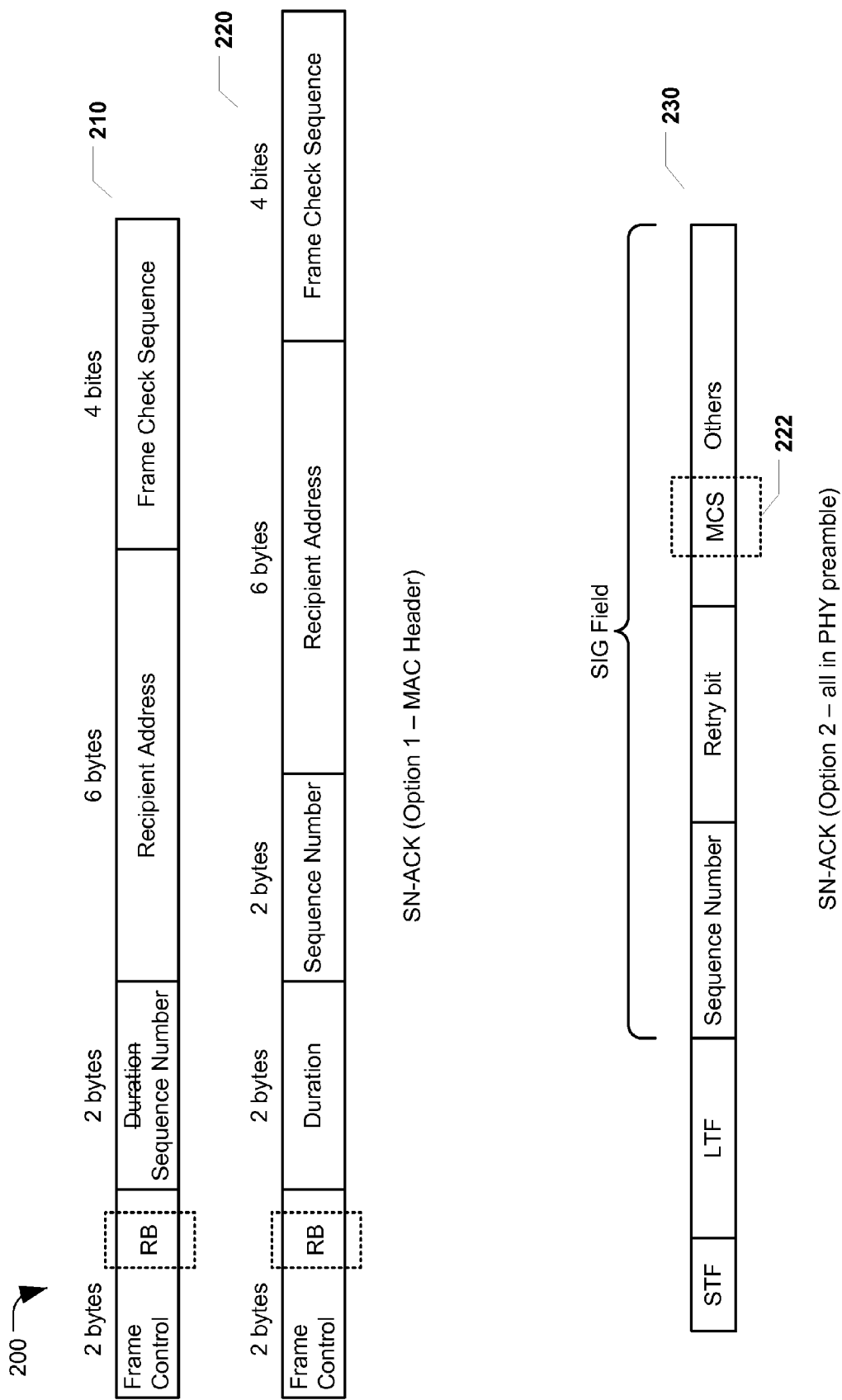
FIG. 2 is a diagram to illustrate particular embodiments of the SN-ACK of FIG. 1.

FIG. 2 is a diagram to illustrate particular embodiments of the SN-ACK 124 of FIG. 1 and is generally designated 200. In a first embodiment, designated "Option 1," the SN-ACK may be included entirely within a MAC Header portion of a frame. For example, an existing ACK frame may be modified to generate the SN-ACK 210 by replacing a duration field of the ACK with a sequence number (SN) field, as shown at 210. Alternately, an additional field may be added for the SN field, as shown at 220. The retry bit (RB) may be added (if not already present in the ACK frame) within the frame control field, as shown.

In a second embodiment, designated "Option 2," the SN-ACK may be a "short SN-ACK" frame that is entirely included in a physical layer (PHY) preamble. For example, the SN field and the retry bit may be included in a signal (SIG) field of the PHY preamble, as shown at 230. In a particular embodiment, a modulation and coding scheme (MCS) field 222 of the PHY preamble may be used to indicate that the frame is a "short SN-ACK" frame. To illustrate, one or more existing wireless standards may use MCS=15 to identify a "short ACK" frame. In a particular embodiment, such wireless standards may be extended to use MCS=14 to identify a "short SN-ACK" frame. In another embodiment, the distinction between a short ACK and short SN-ACK may be implicit and may be determined by the type of frame for which this particular control response frame is generated. As an example, the ACK response to a BAR frame is a short SN-ACK while the ACK responses to MPDUs with an acknowledgement policy set to 'normal ACK' are short ACKs.

Figure 3:
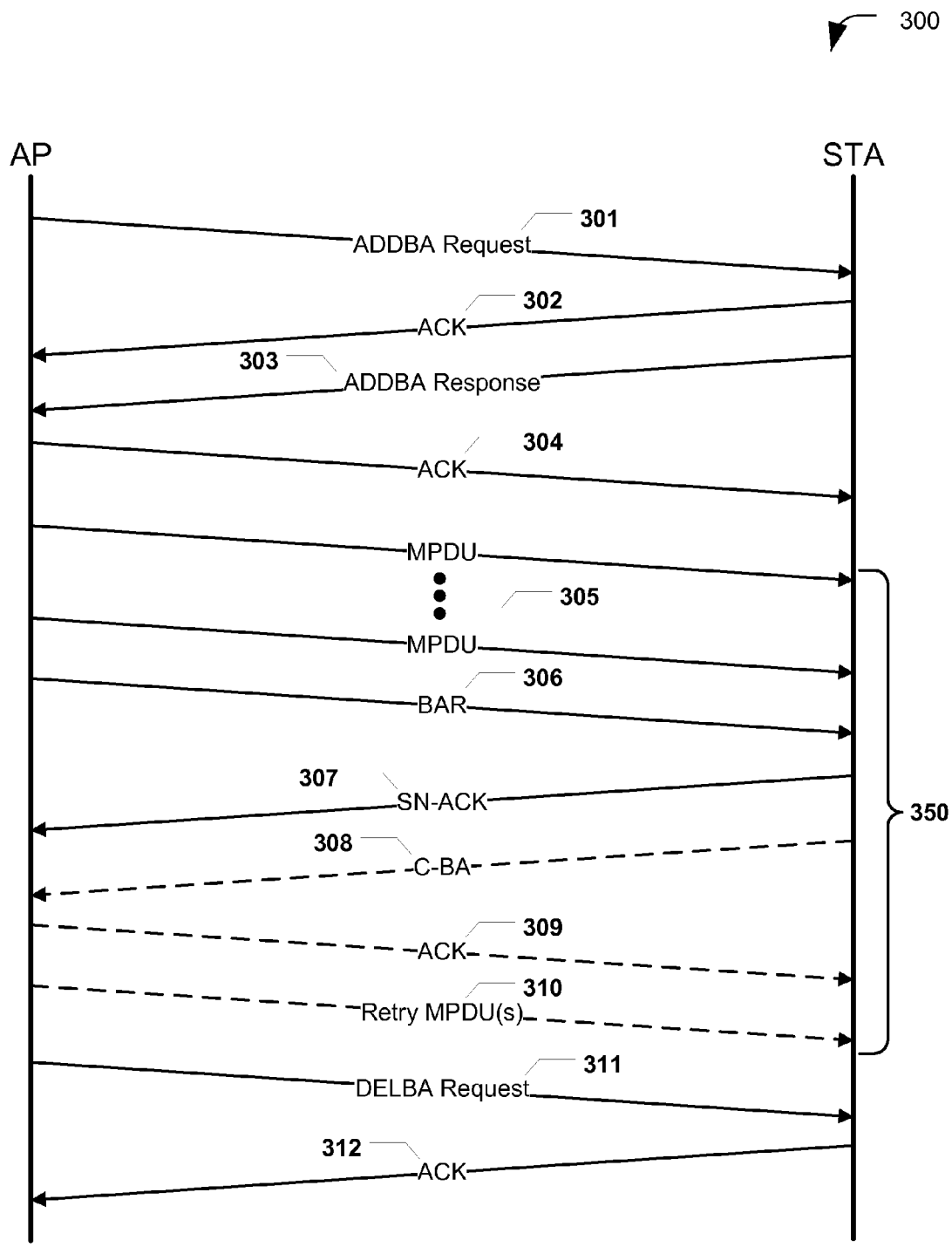
FIG. 3 is a ladder diagram to illustrate a particular embodiment of messaging in the system of FIG. 1.

FIG. 3 is a ladder diagram to illustrate a particular embodiment of messaging in a wireless communication system (e.g., the wireless communication system 100 of FIG. 1) and is generally designated 300. In the embodiment shown in FIG. 3, an AP (e.g., the AP 104 of FIG. 1) acts as an originator and an STA (e.g., the STA 106 of FIG. 1) acts as a recipient. It should be noted that this is for example only. Block acknowledgement may also be performed when an STA is the originator and an AP (or another STA) is the recipient.

To start a block acknowledgement (BA) session, the AP may send an Add Block ACK (ADDBA) Request 301 to the STA. The STA may send an ACK 302 for the ADDBA Request 301 and may send an ADDBA Response 303 indicating that a BA session 350 has begun. During the BA session 350, the AP may send one or more packets, such as MPDUs 305 to the STA. The AP may then send a BAR 306 to the STA, indicating that block acknowledgement for the MPDUs 305 is requested.

In response to the BAR 306, the STA may send a SN-ACK 307 to the AP, where the SN-ACK identifies the last consecutively correctly received MPDU and includes a retry bit indicating whether any MPDUs after the last consecutively correctly received MPDU were successful. If the retry bit is asserted, the STA may also send a C-BA 308 to the STA, where the C-BA 308 includes a bitmap identifying erroneous MPDUs, and the AP may send an ACK 309 responsive to the C-BA 308. The AP may then retry any erroneous MPDUs 310. This process may be repeated multiple times during the BA session 350. To terminate the BA session 350, the AP may send a Delete Block ACK (DELBA) Request 311 to the STA and the STA may respond with an ACK 312.

Figure 4:
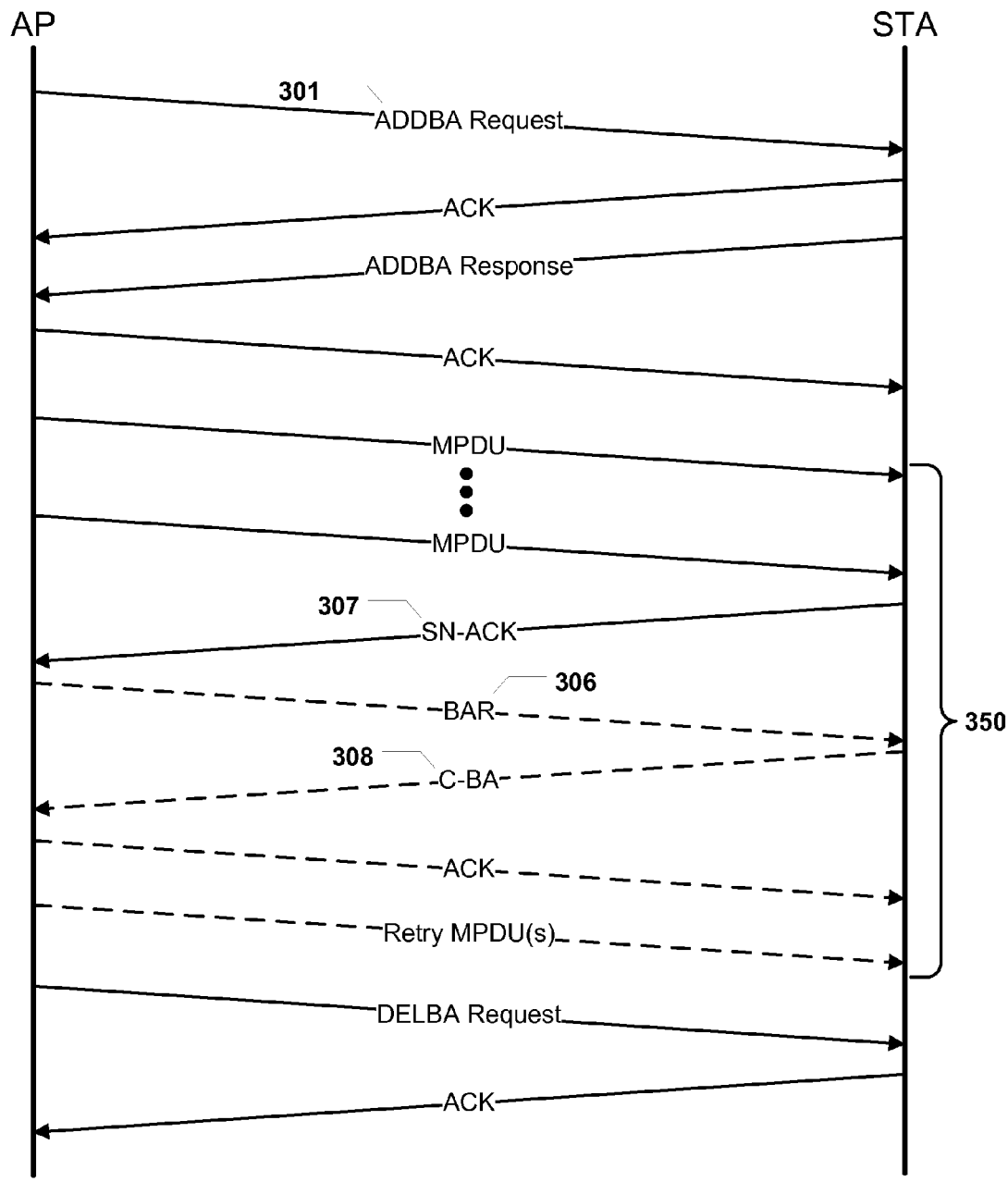
FIG. 4 is a ladder diagram to illustrate another particular embodiment of messaging in the system of FIG. 1.

FIG. 4 is a ladder diagram to illustrate another particular embodiment of messaging in a wireless communication system (e.g., the wireless communication system 100 of FIG. 1) and is generally designated 400. In the embodiment shown in FIG. 4, an AP (e.g., the AP 104 of FIG. 1) acts as an originator and an STA (e.g., the STA 106 of FIG. 1) acts as a recipient. It should be noted that this is for example only. Block acknowledgement may also be performed when an STA is the originator and an AP (or another STA) is the recipient.

In contrast to the block acknowledgement scheme of FIG. 3, in FIG. 4, the STA may send the SN-ACK 307 to the AP at the end of MPDU transmission, without having received the BAR 306. The STA may determine that MPDU transmission has finished based on a time since a last received MPDU (e.g., if more than a short inter-frame space (SIFS) time has passed since a last MPDU reception), based on whether a maximum number of MPDUs per block ACK is reached, based on a number of MPDUs to be transmitted (e.g., as indicated in a previous frame, such as the ADDBA Request 301), or based on some other information or rules specified by existing or future industry standard(s). If the retry bit of the SN-ACK 307 is asserted, the AP may send the BAR 306 to request the C-BA 308. In this embodiment, the AP may treat the SN-ACK 307 as acknowledging the consecutively correctly received MPDUs. For example, referring to Example 2 described above, the SN-ACK may be treated as an acknowledgement of MPDUs 1-5. Thus, the SSN of the BAR may identify the first or second erroneous MPDU (e.g., MPDU 6 or 7) instead of the earliest MPDU (e.g., MPDU 1) as in FIG. 3.

FIG. 5 is a flow chart to illustrate a particular embodiment of a method 500 of operation at a recipient (e.g., the STA 106 of FIG. 1). The method 500 may include receiving, at a first device, a BAR from a second device, where the BAR includes a SSN of an earliest data unit of a plurality of data units sent by the second device to the first device, at 502. For example, in FIG. 1, the STA 106 may receive the BAR 122 from the AP 104.

The method 500 may also include, in response to the BAR, sending a SN-ACK to the second device, at 504. The SN-ACK may identify a last consecutively correctly received data unit of the plurality of data units and the SN-ACK may include a retry bit indicating whether at least one data unit was received by the first device subsequent to the last consecutively correctly received data unit. For example, in FIG. 1, the STA 106 may send the SN-ACK 124 to the AP 104.

The method 500 may further include determining whether the retry bit is asserted (e.g., has a first value), at 506. When the retry bit has the first value, the method 500 may include sending a C-BA to the second device, at 508. The C-BA may include a bitmap, where each particular bit of the bitmap indicates whether a corresponding data unit was correctly received. For example, in FIG. 1, the STA 106 may send the C-BA 126 to the AP 104. When the retry bit is de-asserted (e.g., has a second value) or after the C-BA is sent, the method 500 may include receiving a retransmission of one or more of the plurality of data units (if any), at 510 or may proceed to transmit MPDUs from a successive (e.g., next) block of MPDUs. To illustrate, the AP 104 may proceed to transmit MPDUs from a next block of MPDUs if the AP 104 has attempted to retransmit erroneous MPDUs from a current block a pre-determined number of times or if a time-out value has been exceeded.

Figure 6:
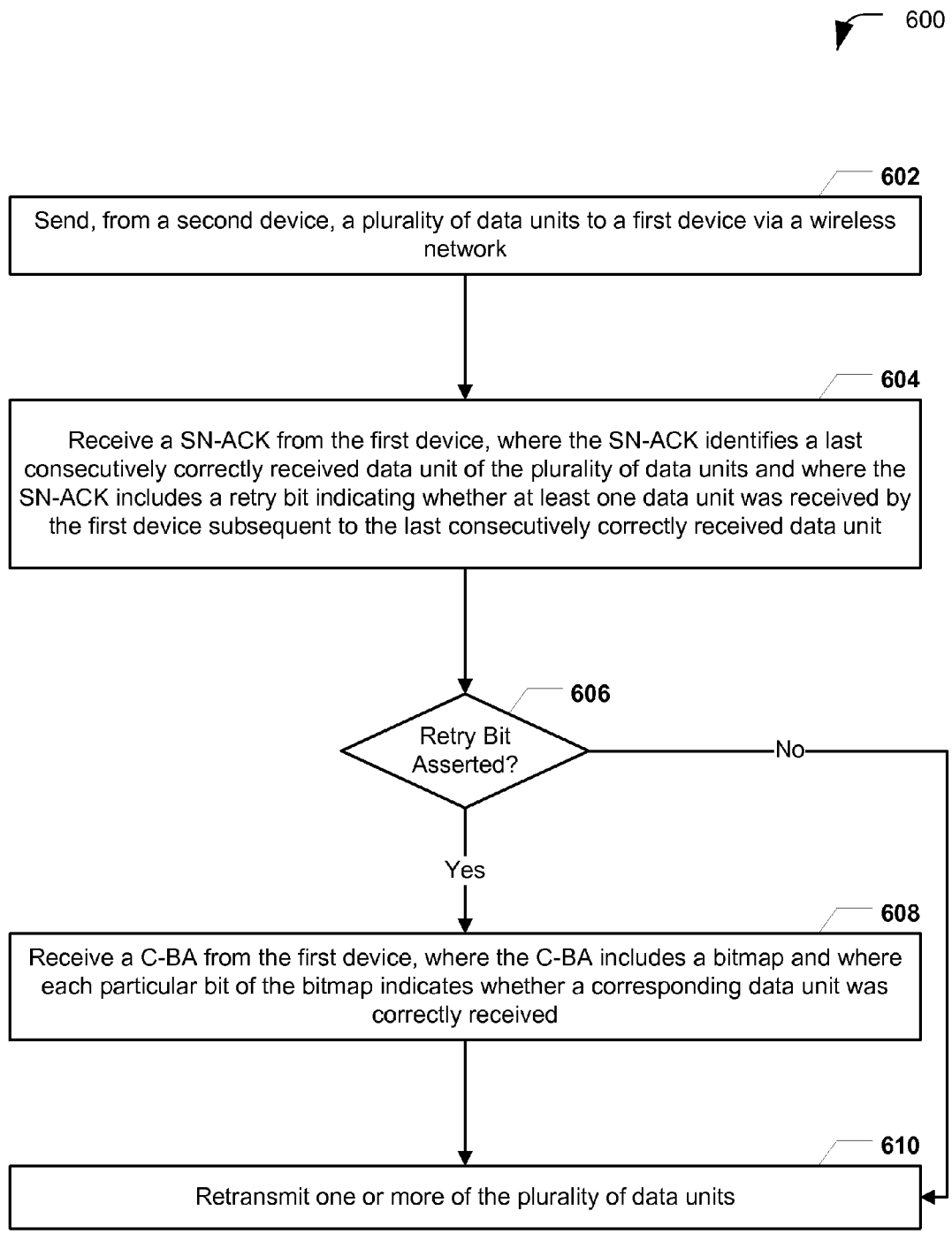
FIG. 6 is a flow chart to illustrate a particular embodiment of a method of operation at an originator.

FIG. 6 is a flow chart to illustrate a particular embodiment of a method 600 of operation at an originator (e.g., the AP 104 of FIG. 1). The method 600 may include sending, from a second device, a plurality of data units to a first device via a wireless network. For example, in FIG. 1, the AP 104 may send the MPDUs 120 to the STA 106.

The method 600 may also include receiving a SN-ACK from the first device, at 604. The SN-ACK may identify a last consecutively correctly received data unit of the plurality of data units and the SN-ACK may include a retry bit indicating whether at least one data unit was received by the first device subsequent to the last consecutively correctly received data unit. For example, in FIG. 1, the AP 104 may receive the SN-ACK 124 from the STA 106.

The method 600 may further include determining whether the retry bit is asserted (e.g., has a first value), at 606. When the retry bit has the first value, the method 600 may include receiving a C-BA from the first device, at 608. The C-BA may include a bitmap, where each particular bit of the bitmap indicates whether a corresponding data unit was correctly received. For example, in FIG. 1, the AP 104 may receive the C-BA 126 from the STA 106. When the retry bit is de-asserted (e.g., has a second value) or after the C-BA is received, the method 600 may include retransmitting of one or more of the plurality of data units (if any), at 610 or may proceed to transmit MPDUs from a successive (e.g., next) block of MPDUs. To illustrate, the AP 104 may proceed to transmit MPDUs from a next block of MPDUs if the AP 104 has attempted to retransmit erroneous MPDUs from a current block a pre-determined number of times or if a time-out value has been exceeded.

Figure 7:
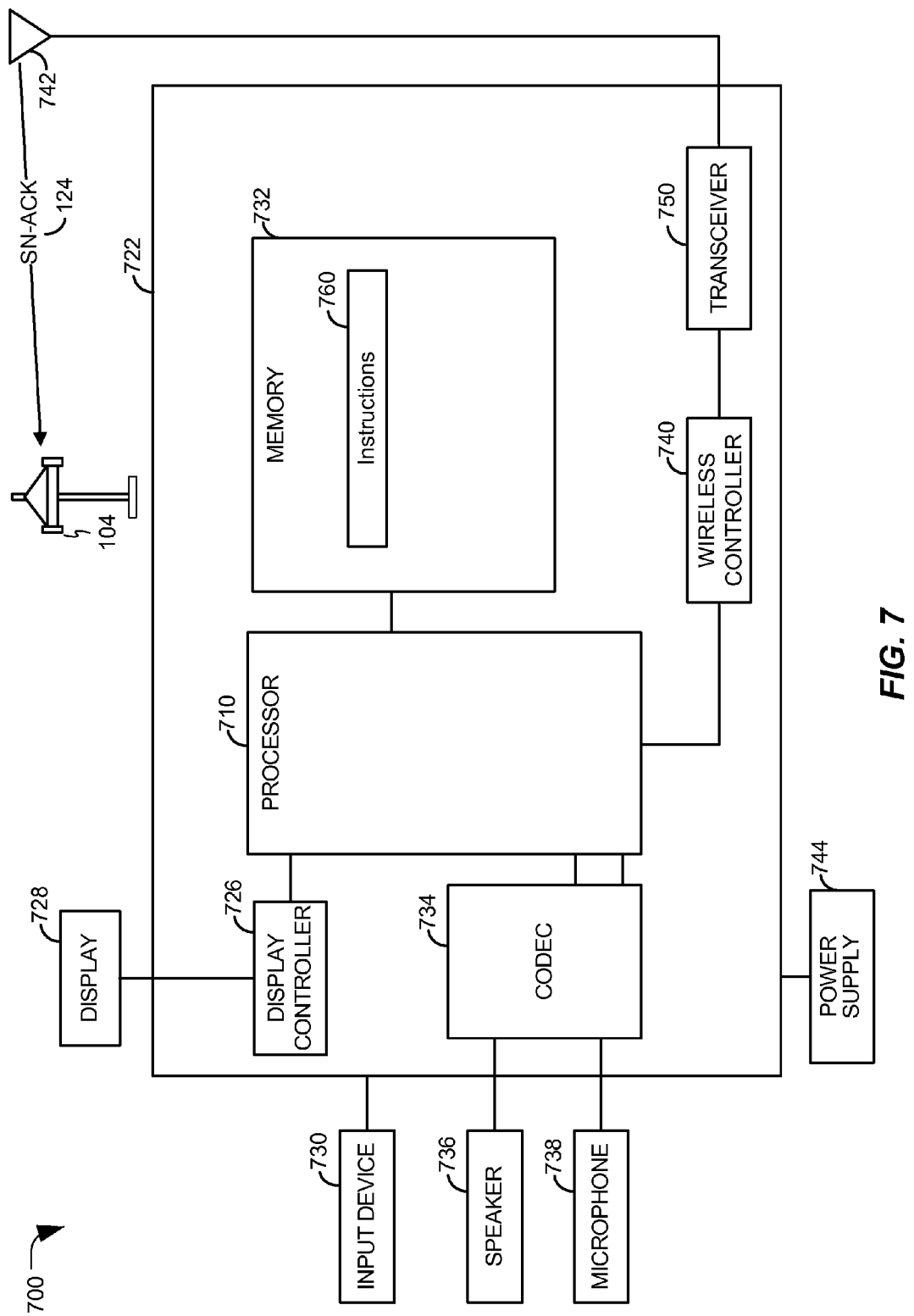
FIG. 7 is a block diagram to illustrate a wireless device into which aspects of the present disclosure may be incorporated.

FIG. 7 is a block diagram of a communication device 700. In one embodiment, the communication device 700, or components thereof, include or are included within the AP 104 of FIG. 1, the STA(s) 106 of FIG. 1, or any combination thereof. Further, all or part of the methods described with reference to FIGS. 5-6 may be performed at or by the communication device 700, or components thereof. The communication device 700 includes a processor 710, such as a digital signal processor (DSP), coupled to a memory 732.

The memory 732 may be a non-transitory tangible computer-readable and/or processor-readable storage device that stores instructions 760. The instructions 760 may be executable by the processor 710 to perform one or more functions or methods described herein, such as the methods described with reference to FIGS. 5-6. For example, the processor 710 may generate messages to be sent and may detect receipt of messages, including but not limited to MPDUs, BARs, SN-ACKs, and BAs (e.g., C-BAs).

FIG. 7 shows that the communication device 700 may also include a display controller 726 that is coupled to the processor 710 and to a display 728. A coder/decoder (CODEC) 734 can also be coupled to the processor 710. A speaker 736 and a microphone 738 can be coupled to the CODEC 734. FIG. 7 also indicates that a wireless controller 740 may be coupled to the processor 710, where the wireless controller 740 is in communication with an antenna 742 via a transceiver 750. The wireless controller 740, the transceiver 750, and the antenna 742 may thus represent a wireless interface that enables wireless communication by the communication device 700. For example, when the communication device 700 is the STA 106 of FIG. 1, such a wireless interface may be used to send the SN-ACK 124 to the AP 104 (e.g., via a sub-1 GHz wireless network). The communication device 700 may include numerous wireless interfaces to different wireless networks, where the different wireless networks are configured to support different networking technologies/standards or combinations of networking technologies/standards.

In a particular embodiment, the processor 710, the display controller 726, the memory 732, the CODEC 734, the wireless controller 740, and the transceiver 750 are included in a system-in-package or system-on-chip device 722. In a particular embodiment, an input device 730 and a power supply 744 are coupled to the system-on-chip device 722. Moreover, in a particular embodiment, as illustrated in FIG. 7, the display device 728, the input device 730, the speaker 736, the microphone 738, the antenna 742, and the power supply 744 are external to the system-on-chip device 722. However, each of the display device 728, the input device 730, the speaker 736, the microphone 738, the antenna 742, and the power supply 744 can be coupled to a component of the system-on-chip device 722, such as an interface or a controller.

In conjunction with the described embodiments, an apparatus is disclosed that includes means for sending a SN-ACK from a first device to a second device via a wireless network. The SN-ACK is associated with a plurality of data units sent by the second device to the first device. The SN-ACK identifies a last consecutively correctly received data unit of the plurality of data units and includes a retry bit indicating whether at least one data unit of the plurality of data units was received by the first device subsequent to the last consecutively correctly received data unit. For example, the means for sending the SN-ACK may include a component of the AP 104 of FIG. 1 or the STA 106 of FIG. 1 (e.g., a network interface and/or a processor), the processor 710 of FIG. 7, the wireless controller 740, the transceiver 750, the antenna 742, one or more other devices configured to send a SN-ACK, or any combination thereof. The apparatus may also include means for sending, when the retry bit has a first value, a BA to the second device after sending the SN-ACK. The BA may include a bitmap, where each particular bit of the bitmap indicates whether a corresponding data unit of the plurality of data units was correctly received by the first device. For example, the means for sending the BA may include a component of the AP 104 of FIG. 1 or the STA 106 of FIG. 1 (e.g., a network interface and/or a processor), the processor 710 of FIG. 7, the wireless controller 740, the transceiver 750, the antenna 742, one or more other devices configured to send a BA, or any combination thereof. The apparatus may further include means for receiving, when the retry bit has a second value and one or more of the plurality of data units were incorrectly received by the first device, a retransmission of the one or more of the plurality of data units without sending the BA to the second device. For example, the means for receiving may include a component of the AP 104 of FIG. 1 or the STA 106 of FIG. 1 (e.g., a network interface and/or a processor), the processor 710 of FIG. 7, the wireless controller 740, the transceiver 750, the antenna 742, one or more other devices configured to receive one or more data units, or any combination thereof.

Another apparatus (e.g., a second device) may include means for sending a plurality of data units to a first device via a wireless network. For example, the means for sending may include a component of the AP 104 of FIG. 1 or the STA 106 of FIG. 1 (e.g., a network interface and/or a processor), the processor 710 of FIG. 7, the wireless controller 740, the transceiver 750, the antenna 742, one or more other devices configured to send data units, or any combination thereof. The apparatus may also include means for receiving a SN-ACK from the first device. The SN-ACK may identify a last consecutively correctly received data unit of the plurality of data units and may include a retry bit indicating whether at least one data unit of the plurality of data units was received by the first device subsequent to the last consecutively correctly received data unit. For example, the means for receiving may include a component of the AP 104 of FIG. 1 or the STA 106 of FIG. 1 (e.g., a network interface and/or a processor), the processor 710 of FIG. 7, the wireless controller 740, the transceiver 750, the antenna 742, one or more other devices configured to receive a SN-ACK, or any combination thereof. The apparatus may further include means for retransmitting, when the retry bit has a first value, one or more data units of the plurality of data units identified as erroneous by a block ACK (BA) received from the first device. The means for retransmitting may also retransmit, when the retry bit has a second value, the one or more data units without receipt of the BA from the first device. For example, the means for retransmitting may include a component of the AP 104 of FIG. 1 or the STA 106 of FIG. 1 (e.g., a network interface and/or a processor), the processor 710 of FIG. 7, the wireless controller 740, the transceiver 750, the antenna 742, one or more other devices configured to retransmit data units, or any combination thereof.

Embodiments described herein may thus enable performing block acknowledgement while communicating a reduced amount of data, which may be especially applicable in IEEE 802.11ah wireless networks. For example, existing block acknowledgement methods may involve sending a constant size bitmap regardless of how many data units are erroneous. In low-data rate networks, (e.g., IEEE 802.11ah networks), communicating such a large amount of data even when few or no data units were erroneous may introduce unacceptable data overhead and transmission delay. Advantageously, block acknowledgement in accordance with the described techniques may reduce the amount of data overhead and transmission delay.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
sending a sequence number acknowledgement (SN-ACK) from a first device to a second device via a wireless network, the SN-ACK associated with a plurality of data units sent by the second device to the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit;
when the retry bit has a first value, sending a compressed block ACK (C-BA) to the second device after sending the SN-ACK, wherein the C-BA indicates whether each of the plurality of data units following the last consecutively correctly received data unit was correctly received by the first device, and wherein the C-BA includes:
a starting sequence number (SSN) indicating an earliest erroneous data unit of the plurality of data units or a second-earliest erroneous data unit of the plurality of data units;
a sequence number (SN) indicating a latest erroneous data unit of the plurality of data units; and
a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit; and
when the retry bit has a second value and one or more of the plurality of data units were incorrectly received by the first device, receiving a retransmission of the one or more data units without sending the C-BA to the second device.

2. The method of claim 1, further comprising when the retry bit has the second value and no data units of the plurality of data units were incorrectly received by the first device, receiving at least one data unit of a next block of data units.

3. The method of claim 1, wherein the SN-ACK includes a SN of the last consecutively correctly received data unit.

4. The method of claim 3, wherein when the retry bit has the first value, the at least one data unit has a SN greater than the SN of the last consecutively correctly received data unit.

5. The method of claim 4, wherein the retry bit is included in a frame control field of the SN-ACK.

6. The method of claim 4, wherein the SN of the last consecutively correctly received data unit and the retry bit are included in a physical layer (PHY) preamble of the SN-ACK.

7. The method of claim 1, further comprising receiving a block ACK (BA) request (BAR) from the second device, wherein the BAR includes a SSN of an earliest data unit of the plurality of data units and wherein the SN-ACK is sent in response to the BAR.

8. The method of claim 1, further comprising receiving a block ACK (BA) request (BAR) from the second device after sending the SN-ACK to the second device.

9. The method of claim 8, wherein the BAR includes a SSN that is greater than a SN of the last consecutively correctly received data unit.

10. The method of claim 1, wherein the C-BA further includes:
a bitmap length indicating a length of the bitmap.

11. The method of claim 1, wherein the wireless network comprises a sub-one gigahertz wireless network.

12. The method of claim 11, wherein the sub-one gigahertz wireless network operates in accordance with an Institute of Electrical and Electronics Engineers (IEEE) 802.11ah standard.

13. An apparatus comprising:
a processor; and
a memory storing instructions executable by the processor to:
generate a sequence number acknowledgement (SN-ACK) to be sent from a first device to a second device via a wireless network, the SN-ACK associated with a plurality of data units received by the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit;

when the retry bit has a first value, generate a compressed block ACK (C-BA) to be sent to the second device after sending the SN-ACK, wherein the C-BA indicates whether each of the plurality of data units following the last consecutively correctly received data unit was correctly received by the first device, and wherein the C-BA includes:
   a starting sequence number (SSN) indicating an earliest erroneous data unit of the plurality of data units or a second-earliest erroneous data unit of the plurality of data units;
   a sequence number (SN) indicating a latest erroneous data unit of the plurality of data units; and
   a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit; and
when the retry bit has a second value and one or more of the plurality of data units were incorrectly received by the first device, detect retransmission of the one or more data units without generating the C-BA to be sent to the second device.

14. The apparatus of claim 13, wherein the SN-ACK includes a SN of the last consecutively correctly received data unit.

15. The method of claim 14, wherein when the retry bit has the first value, the at least one data unit has a SN greater than the SN of the last consecutively correctly received data unit.

16. The apparatus of claim 15, wherein the retry bit is included in a frame control field of the SN-ACK or in a physical layer (PHY) preamble of the SN-ACK.

17. The apparatus of claim 13, wherein the memory further stores instructions executable by the processor to detect receipt of a block ACK (BA) request (BAR) from the second device, wherein the BAR includes a SSN of an earliest data unit of the plurality of data units and wherein the SN-ACK is sent in response to the BAR.

18. The apparatus of claim 13, wherein the memory further stores instructions executable by the processor to detect receipt of a block ACK (BA) request (BAR) from the second device after the SN-ACK is sent to the second device.

19. The apparatus of claim 18, wherein the BAR includes a SSN that is equal to a SN of the last consecutively correctly received data unit.

20. The apparatus of claim 13, wherein the C-BA further includes:
   a bitmap length indicating a length of the bitmap.

21. The apparatus of claim 13, wherein the wireless network comprises a sub-one gigahertz wireless network configured to operate in accordance with an Institute of Electrical and Electronics Engineers (IEEE) 802.11ah standard.

22. An apparatus comprising:
   means for sending a sequence number acknowledgement (SN-ACK) from a first device to a second device via a wireless network, the SN-ACK associated with a plurality of data units received by the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit;
   means for sending, when the retry bit has a first value, a compressed block ACK (C-BA) to the second device after sending the SN-ACK, wherein the C-BA indicates whether each of the plurality of data units following the last consecutively correctly received data unit was correctly received by the first device, and wherein the C-BA includes:
      a starting sequence number (SSN) indicating an earliest erroneous data unit of the plurality of data units or a second-earliest erroneous data unit of the plurality of data units;
      a sequence number (SN) indicating a latest erroneous data unit of the plurality of data units; and
      a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit; and
   means for receiving, when the retry bit has a second value and one or more of the plurality of data units were incorrectly received by the first device, a retransmission of the one or more data units without sending the C-BA to the second device.

23. The apparatus of claim 22, wherein the SN-ACK includes a SN of the last consecutively correctly received data unit.

24. A non-transitory processor-readable medium comprising instructions that, when executed by a processor, cause the processor to:
   generate a sequence number acknowledgement (SN-ACK) to be sent from a first device to a second device via a wireless network, the SN-ACK associated with a plurality of data units received by the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit;
   when the retry bit has a first value, generate a compressed block ACK (C-BA) to be sent to the second device after sending the SN-ACK, wherein the C-BA indicates whether each of the plurality of data units following the last consecutively correctly received data unit was correctly received by the first device, and wherein the C-BA includes:
      a starting sequence number (SSN) indicating an earliest erroneous data unit of the plurality of data units or a second-earliest erroneous data unit of the plurality of data units;
      a sequence number (SN) indicating a latest erroneous data unit of the plurality of data units; and
      a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit; and
   when the retry bit has a second value and one or more of the plurality of data units were incorrectly received by the first device, detect retransmission of the one or more data units without generating the BA to be sent to the second device.

25. The non-transitory processor-readable medium of claim 24, wherein the SN-ACK includes a SN of the last consecutively correctly received data unit.

26. A method comprising:
sending, from a second device, a plurality of data units to a first device via a wireless network;
receiving a sequence number acknowledgement (SN-ACK) from the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit;
when the retry bit has a first value, retransmitting one or more data units of the plurality of data units identified as erroneous by a compressed block ACK (C-BA) received from the first device, wherein the C-BA indicates whether each of the plurality of data units following the last consecutively correctly received data unit was correctly received by the first device, and wherein the C-BA includes:
a starting sequence number (SSN) indicating an earliest erroneous data unit of the plurality of data units or a second-earliest erroneous data unit of the plurality of data units;
a sequence number (SN) indicating a latest erroneous data unit of the plurality of data units; and
a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit; and
when the retry bit has a second value, retransmitting one or more data units without receiving the C-BA from the first device.

27. An apparatus comprising:
a processor; and
a memory storing instructions executable by the processor to:
generate, at a second device, a plurality of data units to be sent to a first device via a wireless network;
detect receipt of a sequence number acknowledgement (SN-ACK) from the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit;
when the retry bit has a first value, initiate retransmission of one or more data units of the plurality of data units identified as erroneous by a compressed block ACK (C-BA) received from the first device, wherein the C-BA indicates whether each of the plurality of data units following the last consecutively correctly received data unit was correctly received by the first device, and wherein the C-BA includes:
a starting sequence number (SSN) indicating an earliest erroneous data unit of the plurality of data units or a second-earliest erroneous data unit of the plurality of data units;
a sequence number (SN) indicating a latest erroneous data unit of the plurality of data units; and
a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit; and
when the retry bit has a second value, initiate retransmission of one or more data units without receipt of the C-BA from the first device.

28. An apparatus, comprising:
means for sending, from a second device, a plurality of data units to a first device via a wireless network;
means for receiving a sequence number acknowledgement (SN-ACK) from the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit; and
means for retransmitting, when the retry bit has a first value, one or more data units of the plurality of data units identified as erroneous by a compressed block ACK (C-BA) received from the first device, wherein the C-BA indicates whether each of the plurality of data units following the last consecutively correctly received data unit was correctly received by the first device, and wherein the C-BA includes:
a starting sequence number (SSN) indicating an earliest erroneous data unit of the plurality of data units or a second-earliest erroneous data unit of the plurality of data units;
a sequence number (SN) indicating a latest erroneous data unit of the plurality of data units; and
a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit,
the means for retransmitting further for retransmitting, when the retry bit has a second value, one or more data units without receipt of the C-BA from the first device.

29. A non-transitory processor-readable medium comprising instructions that, when executed by a processor, cause the processor to:
generate, at a second device, a plurality of data units to be sent to a first device via a wireless network;
detect receipt of a sequence number acknowledgement (SN-ACK) from the first device, wherein the SN-ACK identifies a last consecutively correctly received data unit of the plurality of data units, and wherein the SN-ACK includes a retry bit indicating whether at least one data unit of the plurality of data units was received by the first device subsequent to the last consecutively correctly received data unit;
when the retry bit has a first value, initiate retransmission of one or more data units of the plurality of data units identified as erroneous by a compressed block ACK (C-BA) received from the first device, wherein the C-BA indicates whether each of the plurality of data units following the last consecutively correctly received data unit was correctly received by the first device, and wherein the C-BA includes:
a starting sequence number (SSN) indicating an earliest erroneous data unit of the plurality of data units or a second-earliest erroneous data unit of the plurality of data units;

a sequence number (SN) indicating a latest erroneous data unit of the plurality of data units; and a bitmap, wherein each particular bit of the bitmap indicates whether a corresponding data unit of the plurality of data units was correctly received by the first device, and wherein the plurality of data units comprises a sequence of data units from the earliest or the second-earliest erroneous data unit to the latest erroneous data unit; and when the retry bit has a second value, initiate retransmission of one or more data units without receipt of the C-BA from the first device.

* * * * *